United States Patent
Crooijmans et al.

(10) Patent No.: US 8,724,837 B2
(45) Date of Patent: May 13, 2014

(54) PERSONAL MEDIA DEVICE DOCKING STATION HAVING AN ACOUSTIC INTERFACE

(75) Inventors: Wim Crooijmans, San Jose, CA (US); Richard Paul Howarth, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1365 days.

(21) Appl. No.: 11/716,080

(22) Filed: Mar. 9, 2007

(65) Prior Publication Data
US 2008/0219488 A1 Sep. 11, 2008

(51) Int. Cl.
*H04R 1/26* (2006.01)

(52) U.S. Cl.
USPC ............ 381/335; 381/336; 381/345; 381/386

(58) Field of Classification Search
USPC ........ 381/333, 77, 58–59, 335–336, 345, 386
See application file for complete search history.

(56) References Cited

U.S. PATENT DOCUMENTS

| | | |
|---|---|---|
| 4,845,738 A | 7/1989 | Takano et al. |
| 5,333,176 A | 7/1994 | Burke et al. |
| 5,797,088 A | 8/1998 | Stamegna |
| 5,991,640 A | 11/1999 | Lilja et al. |
| 6,461,181 B1 | 10/2002 | Goh et al. |
| 6,539,358 B1 | 3/2003 | Coon et al. |
| 6,704,580 B1 | 3/2004 | Fintel |
| 6,766,175 B2 | 7/2004 | Uchiyama |
| 7,110,789 B1 | 9/2006 | Curtiss et al. |
| 7,177,403 B2 | 2/2007 | Meyerson et al. |
| 7,222,207 B2 | 5/2007 | Falcon |
| 2004/0125979 A1* | 7/2004 | Elidan et al. .................. 381/382 |
| 2004/0224638 A1 | 11/2004 | Fadell et al. |
| 2005/0227581 A1* | 10/2005 | Libretti ........................ 446/482 |
| 2006/0105819 A1* | 5/2006 | Liao ........................... 455/569.2 |
| 2006/0255936 A1* | 11/2006 | Mathews et al. ......... 340/539.15 |
| 2008/0049147 A1 | 2/2008 | Ho |
| 2008/0149417 A1 | 6/2008 | Dinh et al. |
| 2009/0158849 A1 | 6/2009 | Gregg et al. |

* cited by examiner

*Primary Examiner* — Duc Nguyen
*Assistant Examiner* — George Monikang
(74) *Attorney, Agent, or Firm* — Blakely, Sokoloff, Taylor & Zafman LLP

(57) ABSTRACT

Systems and methods are provided for a media device docking station having one or more acoustic channels to transfer sound to or from the media device while the media device is docked with the docking station.

32 Claims, 12 Drawing Sheets

PERSONAL MEDIA DEVICE DOCKING STATION HAVING AN ACOUSTIC INTERFACE

BACKGROUND

This invention relates to docking stations for personal media devices and, more particularly, to docking stations having acoustic interfaces for personal media devices.

The proliferation of compact portable personal media devices (e.g., portable MP3 players, portable video players, and media capable cellular telephones) has created a need for improved delivery of audio (e.g., voice and music) to users while respecting the need to minimize the overall form factor of personal media devices. Many portable personal media devices can be detachably mounted to or interfaced with a docking station, which may include a platform, support structure, electrical connector, or device holding mechanism, to enable convenient and efficient positioning, storing, and interfacing with other devices. A docking station may position the media device in a functionally more efficient or aesthetically pleasing position, secure the media device, or enable charging of a battery of the media device.

One problem with existing media device docking stations is that the structure of the docking station can interfere with or block the reception or delivery of sound to or from the media device. By interfering with or muffling the transmission of sound, the docking station reduces the sound quality received or transmitted by the media device.

Another problem with existing media device docking stations is that the structure of the docking station, by interfering with the transmission of sound to and from the media device, can create a feedback or echo between a speaker and microphone of the media device while the media device is docked to the docking station. This feedback or echo reduces the sound quality received or transmitted by the media device.

SUMMARY

The invention, in various embodiments, addresses deficiencies in the prior art by providing systems, methods and devices that enhance the quality of sound emitted from or received by a media device while the media device is docked to a docking station.

In various aspects, the invention relates to a docking station capable of receiving a portable or personal media device that includes a speaker and microphone at its mating end or surface (e.g., bottom end or surface). In one aspect, a gap is established at the interface between the well walls of the docking station and the housing of the media device while the media device is docked with the docking device. The gap allows sound or audio to travel freely to or from the media device with minimal interference from the docking station to prevent the muffling of the audio. In one configuration, a sound gap is established using a connector that raises the bottom end of the media device relative to the mating surface of the well of the docking station while the media device is docked.

In another aspect, one or more audio passages or acoustic channels are provided through the docking station to enable audio or sound to travel freely from the media device to outside of the docking station while the media device is docked. This arrangement reduces muffling and feedback between a speaker and microphone of a docked media device. In one configuration, the well of the docking station includes one or more audio holes or acoustic apertures through which sound may be received for a microphone or sound may be transmitted from a speaker of the media device. In certain configurations, the acoustic apertures are coupled to one or more acoustic channels that extend through a portion of the docking station to one or more external acoustic apertures on the outer wall or walls of the docking station.

In one feature, the docking station well includes a first set of internal acoustic apertures for distributing sound to a microphone of the media device while a second set of internal acoustic apertures collect sound from a speaker of the media device. In one configuration, each internal acoustic aperture or set of apertures are coupled to the same acoustic channel.

In another configuration, each internal acoustic aperture or set of apertures are coupled to different spatially separated acoustic channels. When different acoustic channels are employed, each spatially separated acoustic channel may be coupled to the same external apertures or different external apertures at the outer walls of the docking station.

Placing the microphone and speaker in a confined space, as happens when a media device is docked, restricts the air movement and increases the sound pressure of the speaker, which in turn creates much stronger coupling of the sound into the microphone. Creating an acoustic channel or gap reduces the sound pressure at the media device to docking station interface and, thereby, reduces the coupling and the associated echo on the remote side where the microphone is located. An acoustic interface may include a gap that enables the flow of sound between a media device and a docking station. An acoustic interface may also include one or more acoustic channels or audio paths within a docking station that facilitates the flow of sound to and from a docked media device.

Various advantages and applications using an acoustic assembly for enhanced acoustic coupling from a media device to a user in accordance with principles of the present invention are discussed in more detail below.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE DISCLOSURE

Figure 1:
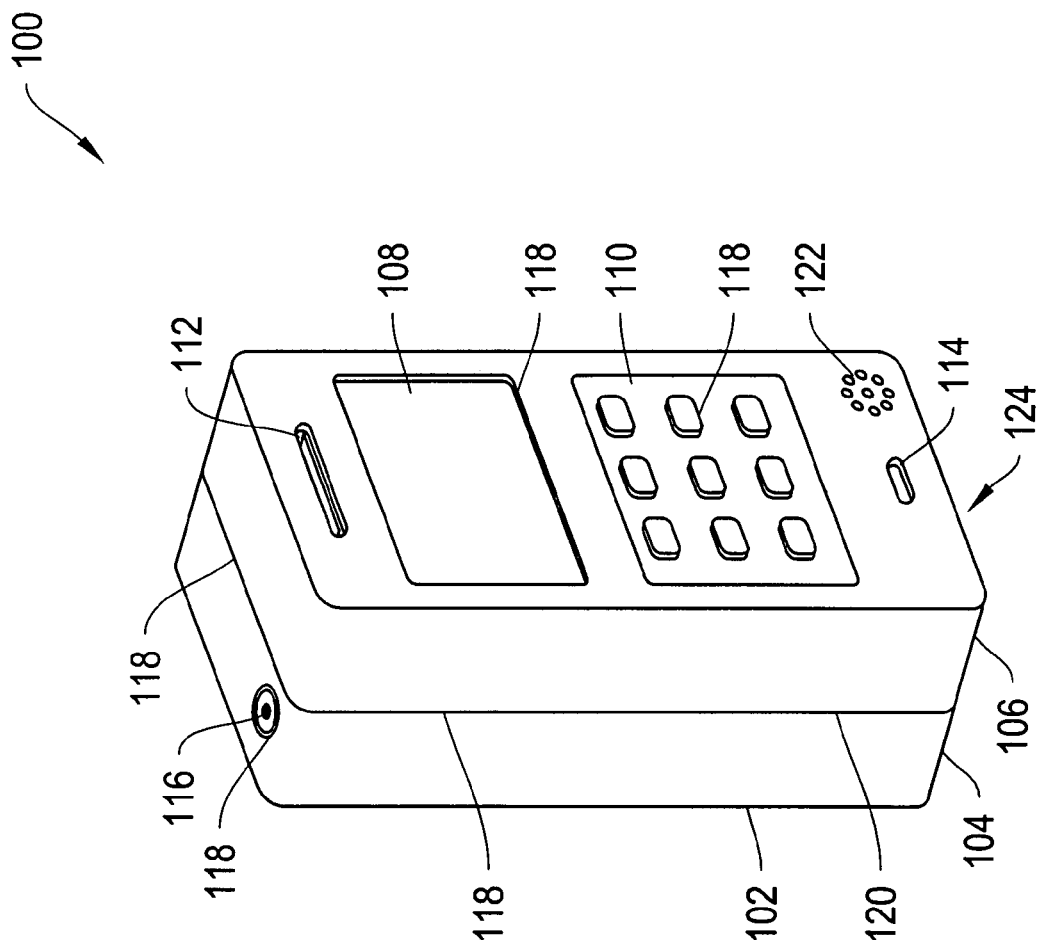
FIG. 1 is a perspective view of a media device according to an illustrative embodiment of the invention.

FIG. 1 is a perspective view of a media device 100 according to an illustrative embodiment of the invention. The media device 100 includes a housing 102, a first housing portion 104, a second housing portion 106, a display 108, a keypad 110, a speaker housing aperture 112, a microphone aperture 114, and a headphone jack 116. The housing 102 also includes various gaps 118 that may include openings, separations, vents, or other pathways between elements of the housing 102 that enable the passage of air or sound through the housing 102. The speaker housing aperture 112 may be located in proximity to a lower portion of the media device 100 and/or a second speaker aperture or apertures 122 may be located in a lower portion of the media device associated with, for example, an internal hands-free speaker. In certain embodiments, the microphone aperture 114 and/or speaker apertures 122 may be located on a bottom side 124 of the media device 100. The aperture 114 and apertures 122 may be located on any portion of the housing 102 to facilitate the delivery and reception of sound.

In one embodiment, the housing 102 includes a first housing portion 104 and a second housing portion 106 that are fastened together to encase various components of the media device 100. The housing 102 and its housing portions 104 and 106 may include polymer-based materials that are formed by, for example, injection molding to define the form factor of the media device 100. In one embodiment, the housing 102 surrounds and/or supports internal components such as, for example, one or more circuit boards having integrated circuit components, internal radio frequency (RF) circuitry, an internal antenna, a speaker, a microphone, a hard drive, a processor, and other components. Further details regarding certain internal components are discussed later with respect to FIG. 3. The housing 102 provides for mounting of a display 108, keypad 110, external jack 116, data connectors, or other external interface elements. The housing 102 may include one or more housing apertures 112 to facilitate delivery of sound, including voice and music, to a user from a speaker within the housing 102. The housing 102 may including one or more housing apertures 114 to facilitate the reception of sounds, such as voice, for an internal microphone from a media device user.

In certain embodiments, the housing 102 includes one or more gaps 118 associated with the housing 102. These gaps 118 may result from the manufacturing and/or assembly process for the media device 100. For example, in certain circumstances, the mechanical attachment of the first housing portion 104 with the second housing portion 106 results in a crease 120 or joint between the portions 104 and 106. In certain media devices 100, the crease 120 is not air tight, resulting in gaps 118 along the crease. Other gaps may be formed during assembly between, for example, one or more keys of the keypad 110 and the housing 102 or the display 108 and the housing 102, resulting in additional gaps 118.

In other embodiments, the housing 102 may include additional portions that are integrated to form the housing 102 for the media device 100.

The media device 100 may include a wireless communications device such as a cellular telephone, satellite telephone, cordless telephone, personal digital assistant (PDA), pager, portable computer, or any other device capable of wireless communications. In fact, FIG. 1 shows an exemplary cellular telephone version of a broad category of media device 100.

The media device 100 may also be integrated within the packaging of other devices or structures such as a vehicle, video game system, appliance, clothing, helmet, glasses, wearable apparel, stereo system, enteraiment system, pr other portable device. In certain embodiments, device 100 may be docked or connected to a wireless enabling accessory system (e.g., a wi-fi docking system) that provides the media device 100 with short-range communicating functionality. Alternative types of media devices 100 may include, for example, a media player such as an iPod or iPhone available by Apple Computer Inc., of Cupertino, Calif., pocket-sized personal computers such as an iPAQ Pocket PC available by Hewlett Packard Inc., of Palo Alto, Calif. and any other device capable of communicating wirelessly (with or without the aid of a wireless enabling accessory system).

In certain embodiments, the media device 100 may synchronize with, for example, a remote computing system or server to receive media (using either wireless or wireline communications paths). Wireless syncing enables the media device 100 to transmit and receive media and data without requiring a wired connection. Media may include, without limitation, sound or audio files, music, video, multi-media, and digital data, in streaming and/or discrete (e.g., files and packets) formats.

During synchronization, a host system may provide media to a client system or software application embedded within the media device 100. In certain embodiments, media and/or data is "downloaded" to the media device 100. In other embodiments, the media device 100 is capable of uploading media to a remote host or other client system.

Further details regarding the capabilities of certain embodiments of the media device 100 are provided in U.S. Pat. No. 7,627,343, issued on Dec. 1, 2009, the entire contents of which are incorporated herein by reference.

Figure 2:
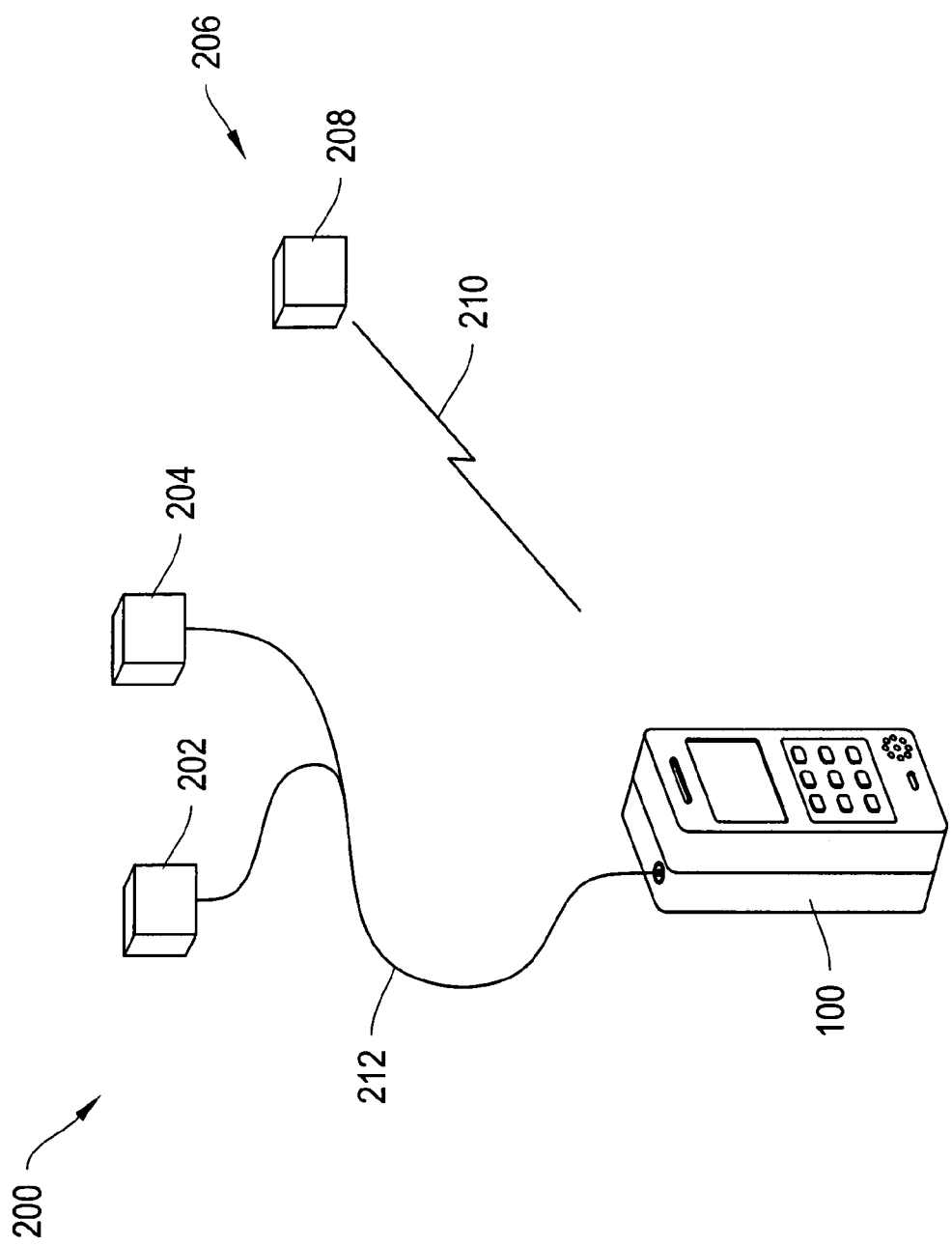
FIG. 2 shows the media device of FIG. 1 with tethered headphones and, alternatively, a wireless earpiece according to an illustrative embodiment of the invention.

FIG. 2 shows the media device 100 of FIG. 1 with tethered headphones 200 and, alternatively, a wireless earpiece 206 according to an illustrative embodiment of the invention. The tethered headphones 200 include a cable 212 that connects to the media device 100 via external jack 116.

In one embodiment, the cable provides for transport of an audio signal from the media device 100 to the headphones 200. In another embodiment, the headphones 200 include a left housing 202 and a right housing 204, corresponding to the left and right ears of a user, respectively. Each housing 202 and 204 may include a speaker and/or an acoustic assembly as described later with respect to FIG. 4. The headphones 200 may optionally include a microphone to facilitate sending sounds from the user to the media device 100. As an alternative to the headphones 200, a user may utilize the wireless earpiece 206 which includes a housing 208. In one embodiment, the earpiece 206 employs wireless channel 210 to receive audio signals from the device 100 or transmit audio signals to the device 100. The housing 208 may include a speaker, microphone, and/or acoustic assembly as described later with respect to FIG. 4.

Figure 3:
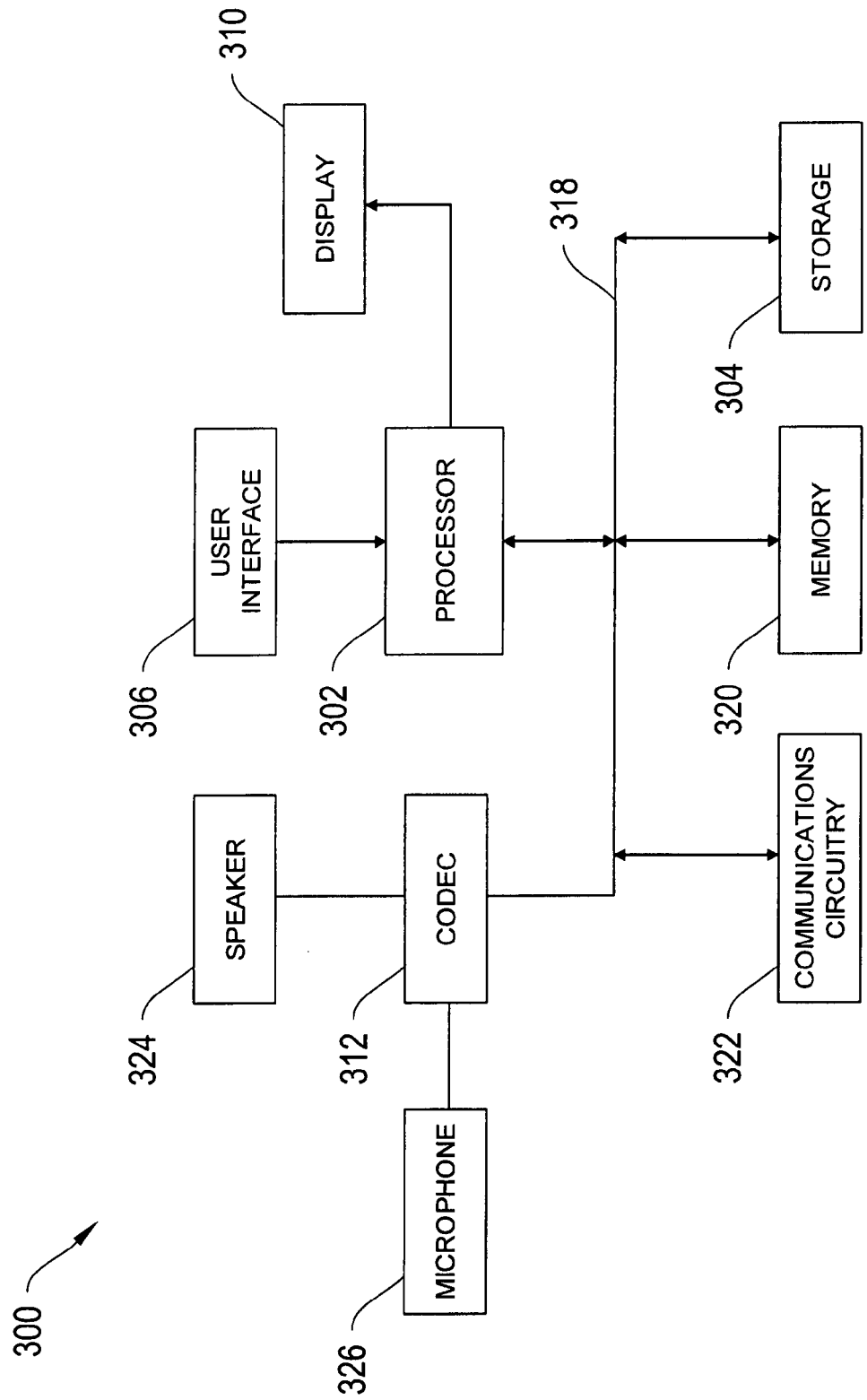
FIG. 3 shows a simplified functional block diagram of a media device according to an illustrative embodiment of the invention.

FIG. 3 shows a simplified functional block diagram of the media device 100 according to an illustrative embodiment of the invention.

The media device or player 300 may include a processor 302, storage device 304, user interface 306, display 310, CODEC 312, bus 318, memory 320, communications circuitry 322, a speaker or transducer 324, and a microphone 326. Processor 302 may control the operation of many functions and other circuitry included in media player 300. Processor 302 may drive display 310 and may receive user inputs from user interface 306.

Storage device 304 may store media (e.g., music and video files), software (e.g., for implanting functions on device 300, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish wireless communication with another device), subscription information (e.g., information that keeps tracks of podcasts or television shows or other media a user subscribes to), and any other suitable data. Storage device 304 may include one more storage mediums, including for example, a hard-drive, permanent memory such as ROM, semi-permanent memory such as RAM, or cache.

Memory 320 may include one or more different types of memory which may be used for performing device functions. For example, memory 320 may include cache, ROM, and/or RAM. Bus 318 may provide a data transfer path for transferring data to, from, or between at least storage device 304, memory 320, and processor 302.

Coder/decoder (CODEC) 312 may be included to convert digital audio signals into an analog signal for driving the speaker 324 to produce sound including voice, music, and other like audio. The CODEC 312 may also convert audio inputs from the microphone 326 into digital audio signals.

User interface 306 may allow a user to interact with the media device 300. For example, the user input device 306 can take a variety of forms, such as a button, keypad, dial, a click wheel, or a touch screen. Communications circuitry 322 may include circuitry for wireless communication (e.g., short-range and/or long range communication). For example, the wireless communication circuitry may be wi-fi enabling circuitry that permits wireless communication according to one of the 802.11 standards. Other wireless network protocol standards could also be used, either in alternative to the identified protocols or in addition to the identified protocols. Other network standards may include Bluetooth, the Global System for Mobile Communications (GSM), and code divisional multiple access (CDMA) based wireless protocols. Communications circuitry 322 may also include circuitry that enables device 300 to be electrically coupled to another device (e.g., a computer or an accessory device) and communicate with that other device.

In one embodiment, the media device 300 may be a portable computing device dedicated to processing media such as audio and video. For example, media device 300 may be a media player (e.g., MP3 player), a game player, a remote controller, a portable communication device, a remote ordering interface, an audio tour player, or other suitable personal device. The media device 300 may be battery-operated and highly portable so as to allow a user to listen to music, play games or video, record video or take pictures, communicate with others, and/or control other devices.

In addition, the media device 300 may be sized such that it fits relatively easily into a pocket or hand of the user.

By being handheld, the media device 300 (or media device 100 shown in FIG. 1) is relatively small and easily handled and utilized by its user and thus may be taken practically anywhere the user travels.

As discussed previously, the relatively small form factor of certain prior art media devices has facilitated the use of docking stations to support a media device during storage or when the device is interfacing with another device such as a PC or power source. While supporting the media device 100, the docking station or unit may, however, inhibit the flow of sound to and from the media device 100 and, thereby, reduce the quality of sound emitted from or delivered to the docked media device 100. Accordingly, embodiments of the invention provide for enhanced sound quality while a media device 100 is docked to a docking station by enhancing the flow of sound using one or more acoustic interfaces within the docking station.

Figure 4:
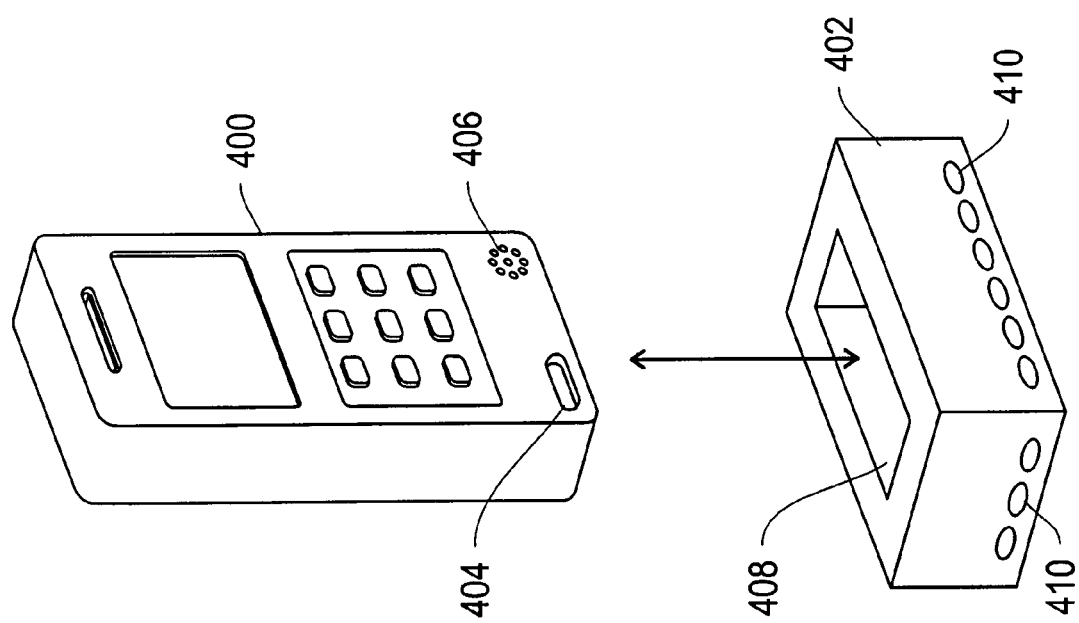
FIG. 4 shows an exploded view of a media device and associated docking station according to an illustrative embodiment of the invention.

FIG. 4 shows an exploded view of media device 400 and associated docking station 402 according to an illustrative embodiment of the invention. In one embodiment, the media device includes at least one microphone aperture 404 and one or more speaker apertures 406. The docking station 402 may include a well 408 and one or more external acoustic apertures 410.

In one embodiment, the one or more of the acoustic apertures 410 are in acoustic communication with either or both the microphone aperture 404 and the speaker apertures 406 of the media device 400 when the media device 400 is docked with the docking station 402. In certain embodiments, the docking station 402 includes internal acoustic channels (not shown) and internal acoustic apertures (not shown) along the well walls that are juxtaposed with one or both of the microphone aperture 404 and speaker apertures 406 while the media device 400 is docked with the docking station 402.

In operation while the media device 400 is docked, sound emitted from the speaker apertures 406 is coupled via one or more internal acoustic channels of the docking station 402 and through one or more external acoustic apertures 410 to the surrounding environment.

In another embodiment, while the media device 400 is docked, sound received by the microphone aperture 404 is coupled via one or more internal acoustic channels of the docking station 402 from one or more external acoustic apertures 410.

The shape and orientation of docking station 402 may vary based on aesthetic and function needs. For example, the docking station may be substantially rectangular, spherical, circular, or irregular, or the like. The external acoustic apertures may be grouped, arranged, configured, and/or distributed in various ways along the external surface or perimeter of the docking station 402. For example, the external acoustic apertures 410 may be arranged in one or more rows along a front, side, and/or back surface of the docking station 402. The external acoustic apertures 410 may be arranged in patterns such as circularly, diagonally, and/or rectangularly along the outer surface of the docking station 402. The docking station 402 may interface with or be juxtaposed with any portion of the media device 400 while the media device 400 is docked. For example, the docking station 402 may function as a holster that enables the media device 400 to detachably connect to the docking station 402. The docking station 402 may have a substantially downward facing well 408 such that the media device 400 is detachably connected with the docking station or hung from the docketing station 402 via an upper portion of the media device 400. While the docking station 402 may assume any one of a multitude of forms and orientations, the docking station 402 may include one or more acoustic channels and apertures 410 that facilitate the efficient transfer of sound to and from the media device 400 while the media device 400 is docked.

Figure 5:
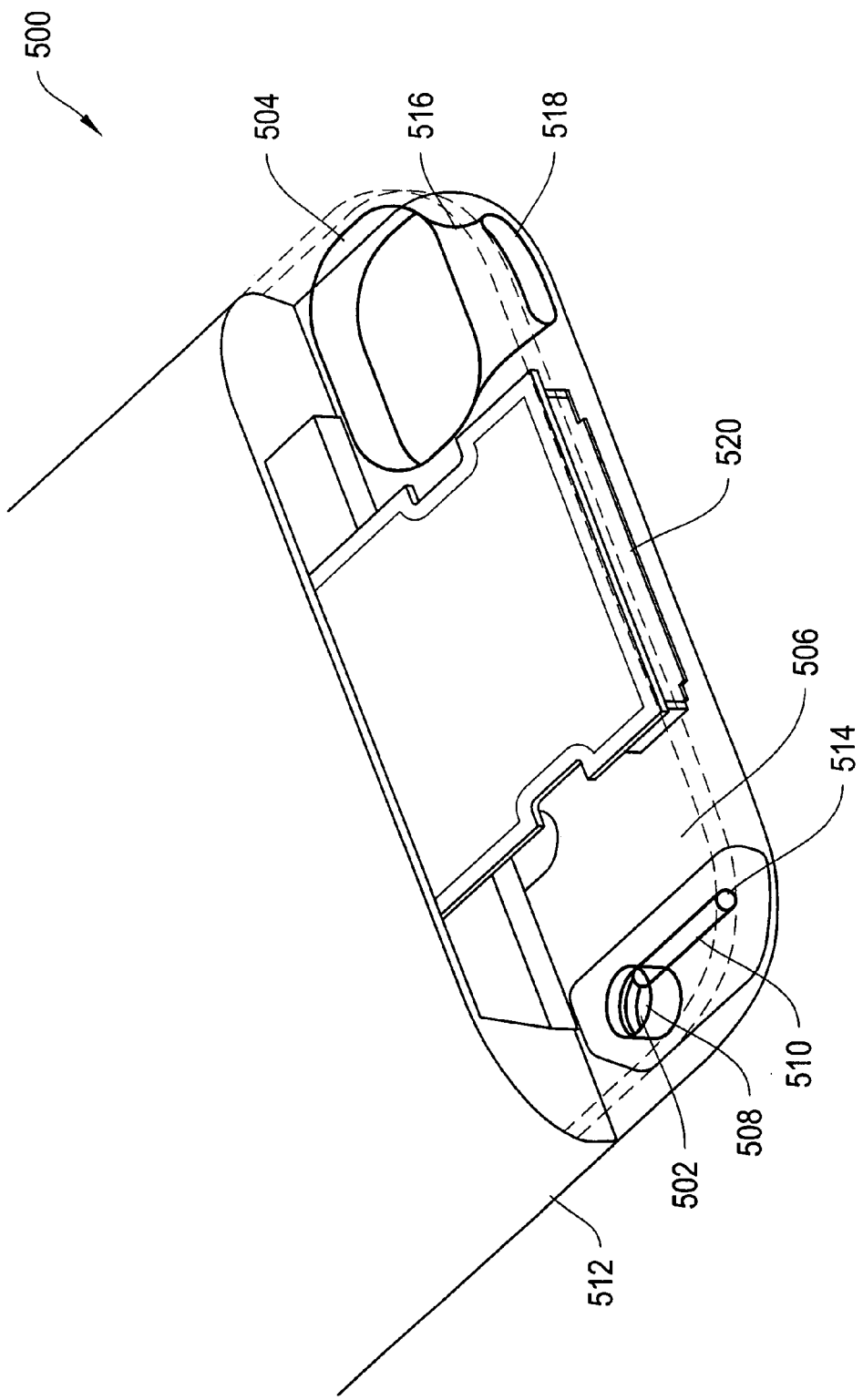
FIG. 5 shows a perspective view of a microphone assembly and speaker assembly within a portion of a media device according to an illustrative embodiment of the invention.

FIG. 5 shows a perspective view of a microphone assembly cavity 502 and speaker cavity 504 within a portion of a media device 500 according to an illustrative embodiment of the invention.

The media device 500 includes frame 506, a frame recess 508, a microphone acoustic channel 510, a housing 512, a sound input aperture 514, a speaker acoustic channel 516, and a sound output aperture 518.

In one embodiment, the cavity 502 is configured to receive and/or enable the mounting of a microphone assembly. The microphone assembly may include a rubber boot that surrounds a portion of the microphone assembly and extends along a portion of the acoustic channel 510. The acoustic channel length may be between 14-15 mm long to optimally couple sound in the 100 Hz to 4 KHz range from the aperture 514 to the microphone assembly disposed in the microphone assembly cavity 502. In one embodiment, the recess 508 enables the mounting of a microphone assembly on the top surface of the frame 506. In another embodiment, the microphone assembly cavity 502 is positioned on the frame 506 to flexibly allow other components such as, for example, an antenna to be positioned in close proximity to the bottom of the media device 500.

In one embodiment, the sound input aperture 514 is located substantially along a bottom portion of the media device 500. In another embodiment, the sound output aperture 518 is located substantially along a bottom portion of the media device 500.

In other embodiments, the one or more sound input or output apertures are located along any portion of the media device 500. In one embodiment, the media device 500 includes a receptacle 520 for detachably connecting the media device 500 to a docking station or other connector.

Figure 6A:
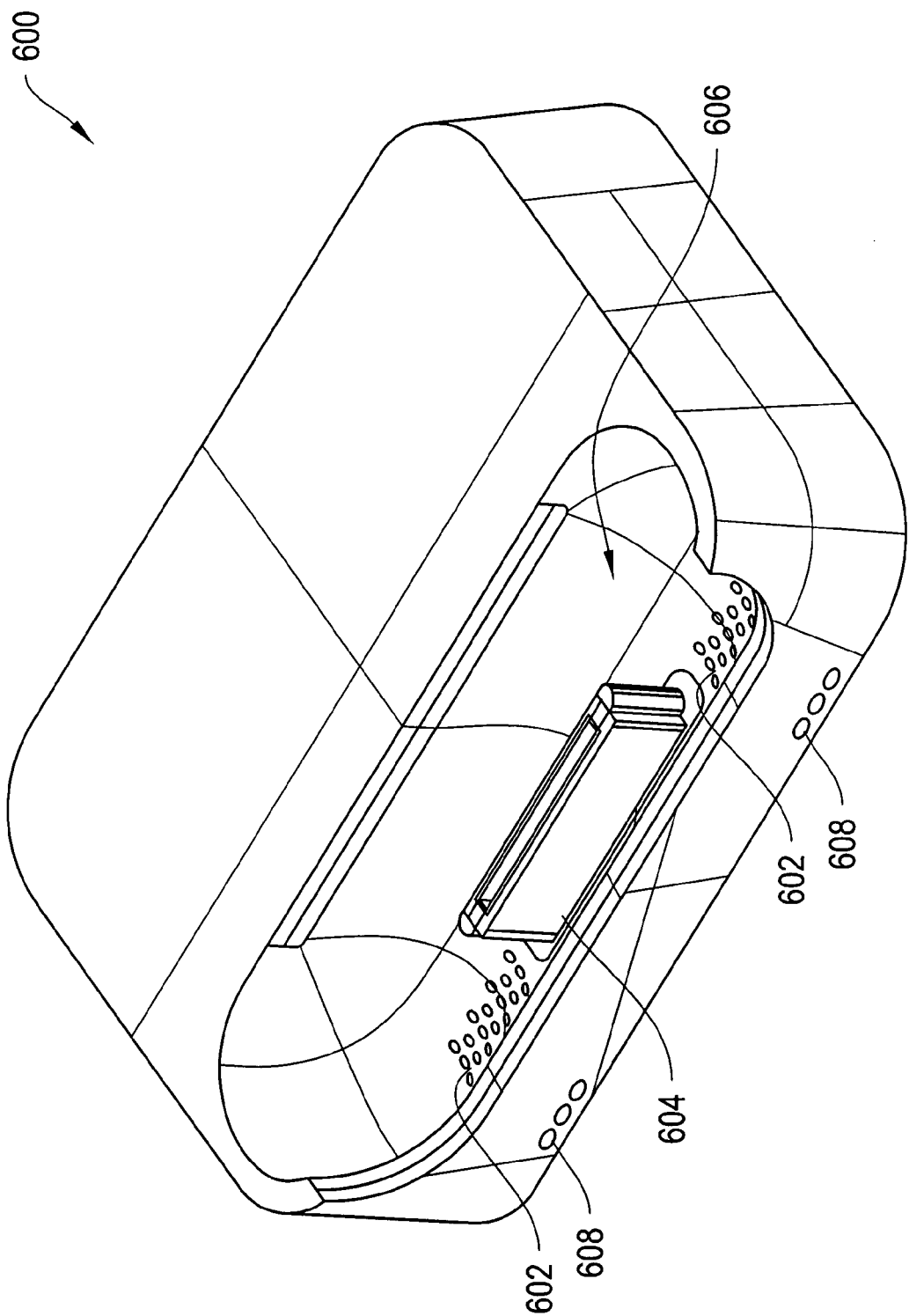
FIG. 6A shows a perspective view of a docking station including acoustic apertures and an electronic connector according to an illustrative embodiment of the invention.

FIG. 6A shows a perspective view of a docking station 600 including internal acoustic apertures 602 and an electronic connector 604 according to an illustrative embodiment of the invention. In one embodiment, the internal acoustic apertures 602 and connector 604 are located within a well 606 of the docking station 600. The docking station 600 may include one or more external acoustic apertures 608 that are in acoustic communication with the internal acoustic apertures 602 via one or more acoustic channels (not shown) within the docking station 600. The male connector 604 may interface or connect with a female connector such as connector 520 shown in FIG. 5. The well 606 may be configured and/or shaped to conform with the shape of a media device such as, for example, media device 500 of FIG. 5.

In one embodiment, the one or more acoustic apertures 602 are positioned substantially adjacent to or juxtaposed with one or more acoustic apertures of a docked media device. For example, the docking station 600 apertures 602 may be positioned adjacent to the sound input aperture 514 of the media device 500 while the media device 500 is docked with the docking station 600. Also, the docking station 600 apertures 602 may be positioned adjacent to the sound output aperture 518 of the media device 500 while the media device 500 is docked with the docking station 600. By positioning the docking station 600 apertures 602 in proximity to the acoustic apertures 514 and 518 of the docked media device 500, the docking station 600 facilitates the flow of sound waves to and from the media device 500 via the docking station apertures 602.

Figure 6B:
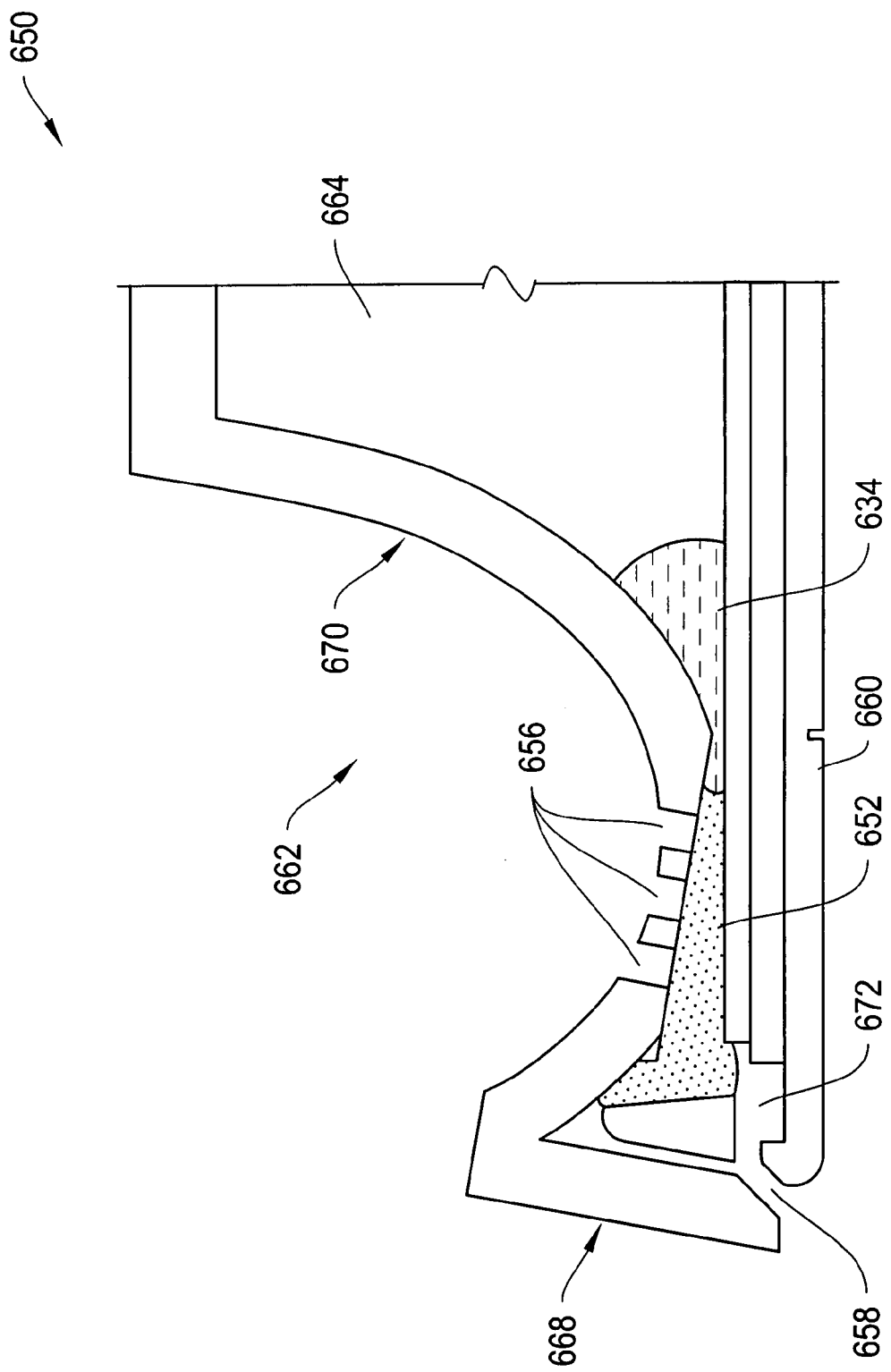
FIG. 6B shows a transverse-sectional view of a docking station including acoustic apertures and an insulator according to an illustrative embodiment of the invention.

FIG. 6B shows a transverse-sectional view of a docking station 650 including acoustic apertures 656 and 658 and insulators 652 and 634 according to an illustrative embodiment of the invention. The docking station 650 includes a well 662 having a well surface 670, a front surface 668, one or more external apertures 658, one or more internal apertures 656, a housing 664, one or more acoustic channels 672, one or more insulators 652 and 634, and a base 660. The insulators 652 and 634 may include foam, polymer, or a like insulating material. The insulator 652 may be positioned inside the housing 664 and between a first set of acoustic channels 672 that transport sound toward a microphone of a media device docked in the well 662 and a second set of acoustic channels 672 that transport sound away from a speaker of a media device docked in the well 662. The insulators 652 and 634 can reduce the coupling of sound between the acoustic channels to reduce possible feedback from the speaker to the microphone of a docked media device. The insulators 652 and 634 may also provide structural support for the housing 664.

In one embodiment, a first set of internal acoustic apertures 656 are coupled to the first set of acoustic channels 672 while a second set of internal acoustic apertures 656 are coupled to a second set of acoustic channels 672. In another embodiment, the external aperture 658 includes a plurality of apertures or openings between the base 660 and surface 668 of the housing 664. In one embodiment, a first set of external apertures 658 is coupled to the first set of acoustic channels 672 while a second set of external acoustic apertures are coupled to the second set of acoustic channels.

Figure 7:
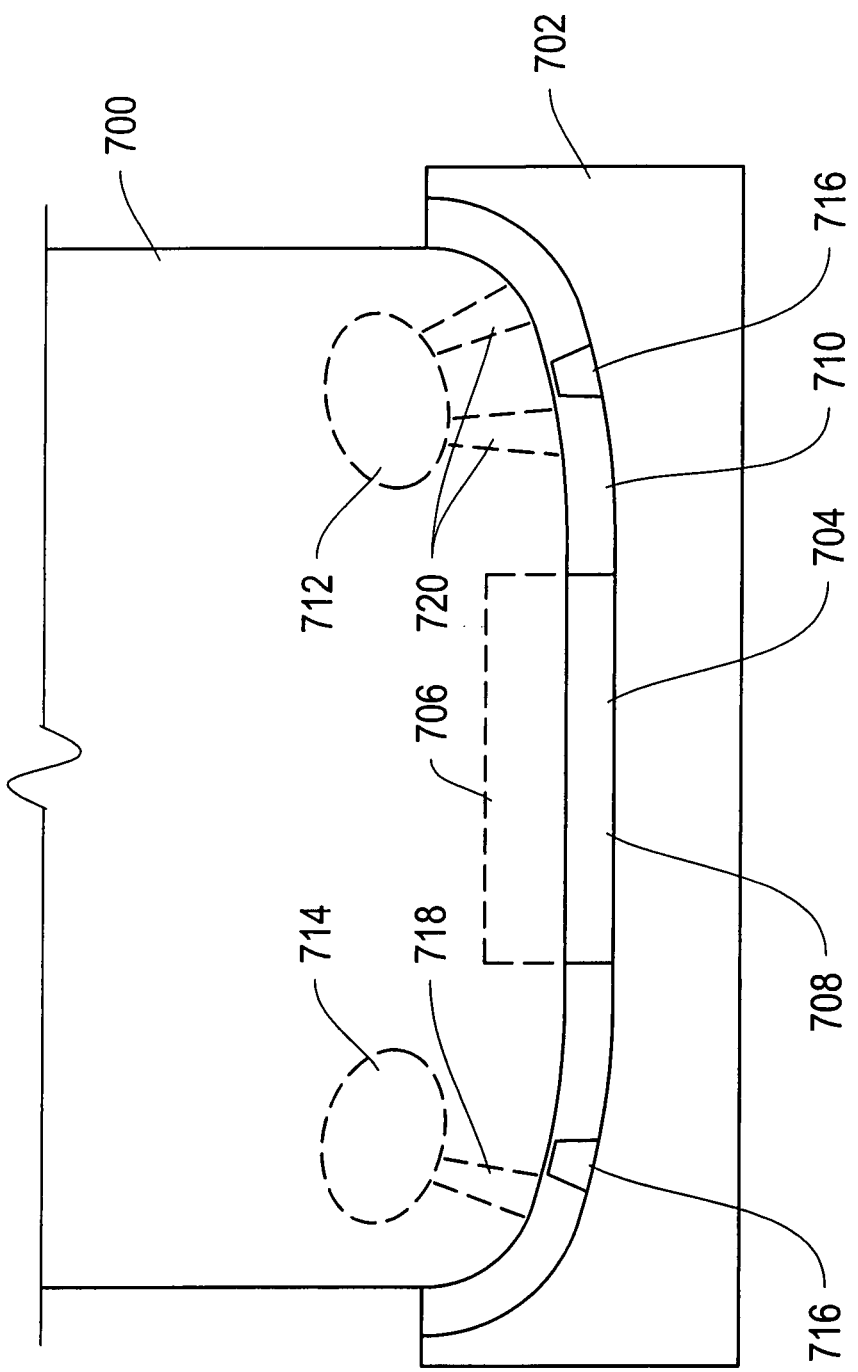
FIG. 7 shows a cross-sectional view of a portion of a media device that is docked to a docking station according to an illustrative embodiment of the invention.

FIG. 7 shows a cross-sectional view of a portion of a media device 700 that is docked to a docking station 702 according to an illustrative embodiment of the invention. In one embodiment, the docking station 702 includes a connector 704 that physically and/or electronically connects with the media device 700. The connector 704 may be a male connector with a portion 706 that extends into a connector of the media device 700 and a portion 708 that does not extend into the media device 700. The length of the portion 708 may define the width of a gap 710 between the media device 700 and the docking station 702. In one embodiment, the gap 710 provides an acoustic pathway or channel that enables the more efficient transfer of sound to and from the media device 700. The gap 710 may also provide pressure relief to reduce the likelihood of feedback from the speaker 712 which could interfere with the reception of sound by the microphone 714. The docking station 702 may also include one or more spacers 716 that establish the gap 710 between the media device 700 and docking station 702. The media device 700 may include a microphone channel 718 and/or one or more speaker channels 720.

Figure 8:
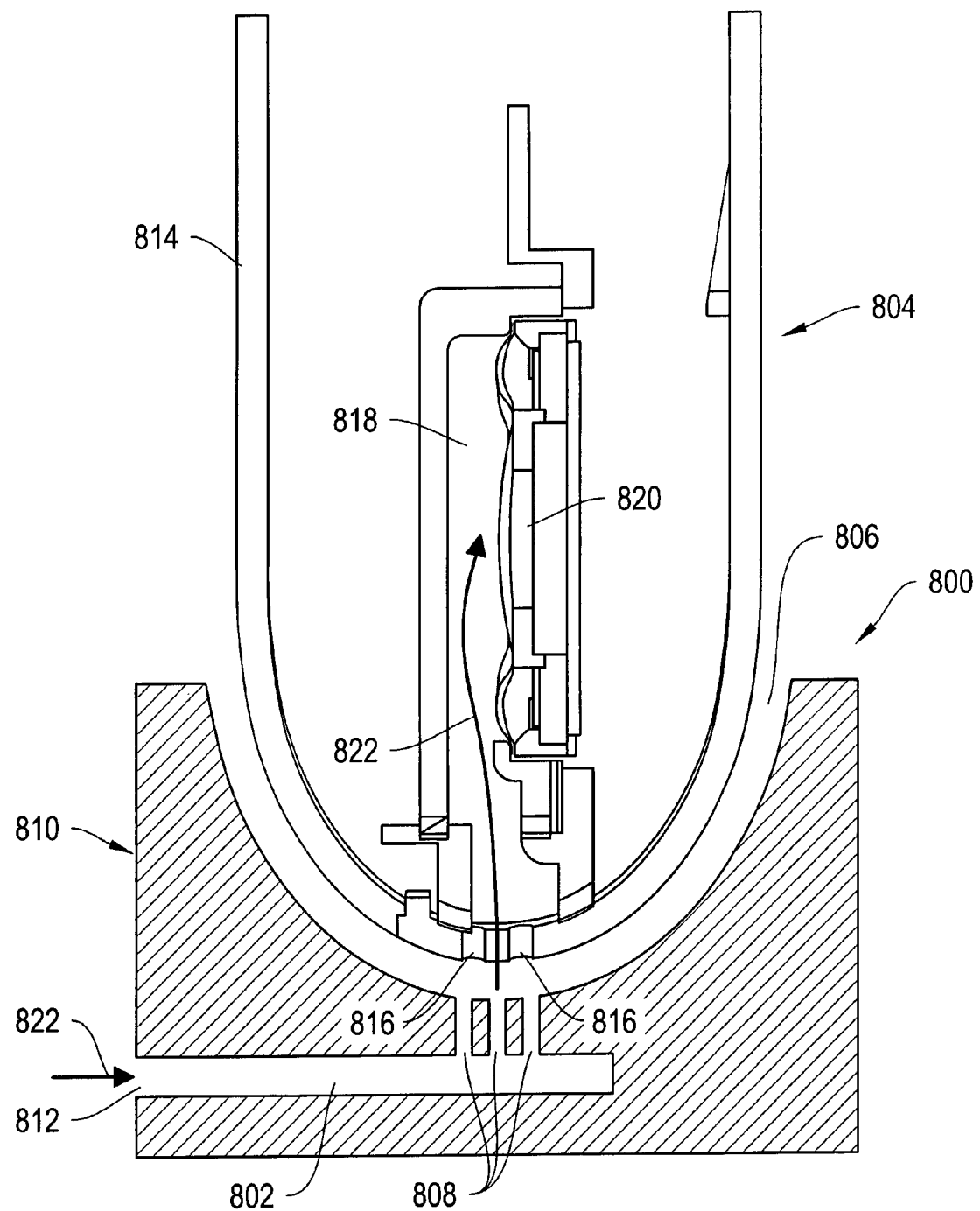
FIG. 8 shows a transverse-sectional view of an acoustic channel within a docking station for the delivery of sound to a portion of a docked media device according to an illustrative embodiment of the invention.

FIG. 8 shows a transverse-sectional view of an acoustic channel 802 within a docking station 800 for the delivery of sound to a portion of a docked media device 804 according to an illustrative embodiment of the invention. The docking station 800 may include a well 806, internal acoustic apertures 808, an external front surface 810, and one or more external apertures 812. Although not shown in FIG. 8, the docking station or unit 800 may include an electrical connector, such as connector 604 of FIG. 6, to which the media device 804 detachably connects while docked with the docking station 800.

The media device 804 may include a housing 814, microphone apertures 816, an internal microphone acoustic channel 818, and a microphone assembly 820.

Although not shown in FIG. 8, the media device 804 may include an electrical receptacle, such as receptacle 520 of FIG. 5, to which the docking station 800 detachably connects while the media device 804 is docked or held by the docking station 800.

In operation, sound 822 is received by the docking station 800 via at least one aperture 812 on the front surface 810 of the docking station 800. The sound 822 travels along one or more acoustic channels 802 toward the internal acoustic apertures 808, positioned along a wall of the well 806. The internal apertures 808 are preferably positioned in relatively close proximity with the microphone apertures 816 of the media device 804 to enhance the coupling of sound from the docking station 800 to the media device 804. The sound 822 passes through the apertures 816 into the microphone acoustic channel 818 and is received by the microphone assembly 820. The microphone assembly 820 includes a microphone that converts the received sound 822 into electrical information for the media device 804 to process further.

The docking station 800 may include a plurality of acoustic channels 802 where each acoustic channel 802 is associated with its own external aperture 812 and internal aperture 808. Alternatively, a portion of the acoustic channels 802 may be inter-connected. While sound 822 is shown as flowing into the acoustic channel 802 from the aperture 812, the acoustic channel 802 may also support the flow of sound 822 or sound waves in an opposite direction and out of the aperture 812. Thus, a portion of the acoustic channels 802 may support sound flow in a bi-directional manner. The docking station may consist of plastic or some other polymer and be formed by molding, pressing, casting or some other known manufacturing process. The docking station may include other materials such as one or more metals. The apertures and acoustic channels may be formed or manufactured by a process including machining, punching, casting, molding, pressing, and/or assembling.

Figure 9:
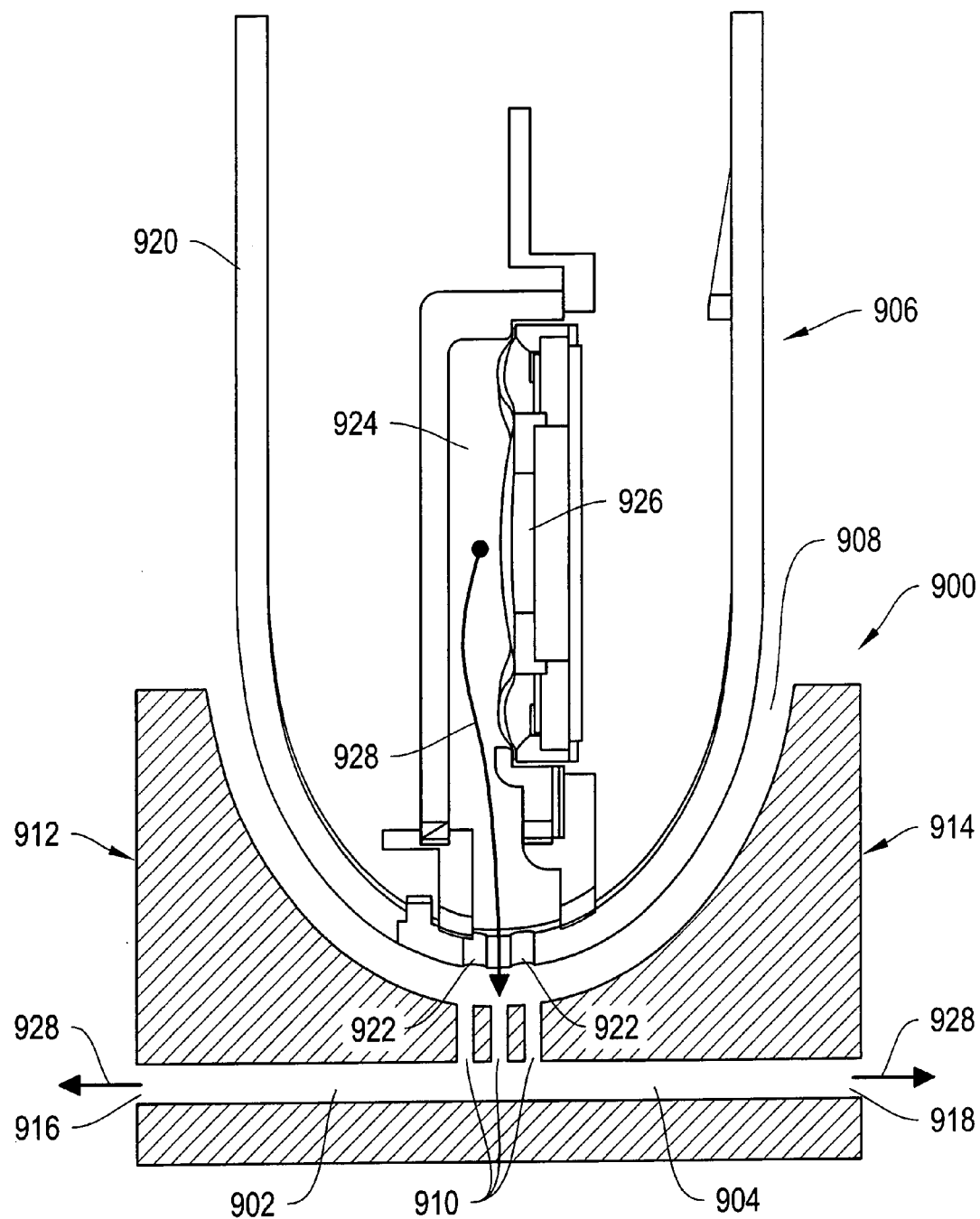
FIG. 9 shows a transverse-sectional view of acoustic channels within a docking station for the delivery of sound from a portion of a docked media device according to an illustrative embodiment of the invention.

FIG. 9 shows a transverse-sectional view of acoustic channels 902 and 904 within a docking station 900 for the delivery of sound from a portion of a docked media device 906 according to an illustrative embodiment of the invention. The docking station 900 may include a well 908, internal acoustic apertures 910, an external front surface 912, and external back surface 914, and one or more external apertures such as apertures 916 and 918.

The external apertures 916 and 918 may be positioned on any external surface including the side, bottom, top, front, back, or any externally facing surface.

Although not shown in FIG. 9, the docking station or unit 900 may include an electrical connector, such as connector 604 of FIG. 6, to which the media device 904 detachably connects while docked with the docking station 900.

The media device 906 may include a housing 920, acoustic output apertures 922, an internal acoustic channel 924, and a speaker assembly 926. Although not shown in FIG. 9, the media device 906 may include an electrical receptacle, such as receptacle 520 of FIG. 5, to which the docking station 900 detachably connects while the media device 906 is docked or held by the docking station 900.

In operation, sound 928 is generated by the speaker assembly 926 and propagated through the channel 924 to the apertures 922. The sound 928 flows through the internal apertures 910 on the surface of the well 908 and into the acoustic channels 902 and 904 within the docking station 900. The docking station 900 emits the sound 928 from the acoustic channel 902 via the aperture 916 on the front surface 912. The docking station 900 may also emit sound 928 from the acoustic channel 904 via the aperture 918 on the back surface 914.

In one embodiment, the acoustic channels 902 and 904 are interconnected. In another embodiment, the acoustic channels 902 and 904 are not interconnected. In one embodiment, acoustic channel 902 includes a plurality of acoustic channels that connects a plurality of internal apertures with a plurality of external apertures. In another embodiment, a portion of the plurality of acoustic channels are interconnected.

The internal apertures 910 are preferably positioned in relatively close proximity with the apertures 922 of the media device 906 to enhance the coupling of sound 928 from the media device 906 to the docking station 900. The speaker assembly 926 may include a speaker and/or one or more transducers or sound emitting mechanisms.

The docking station 900 may include a plurality of acoustic channels where each acoustic channel is associated with its own external aperture and internal aperture. Alternatively, a portion of the acoustic channels may be inter-connected. A portion of the acoustic channels 902 and 904 may support sound flow in a bi-directional manner.

Figure 10:
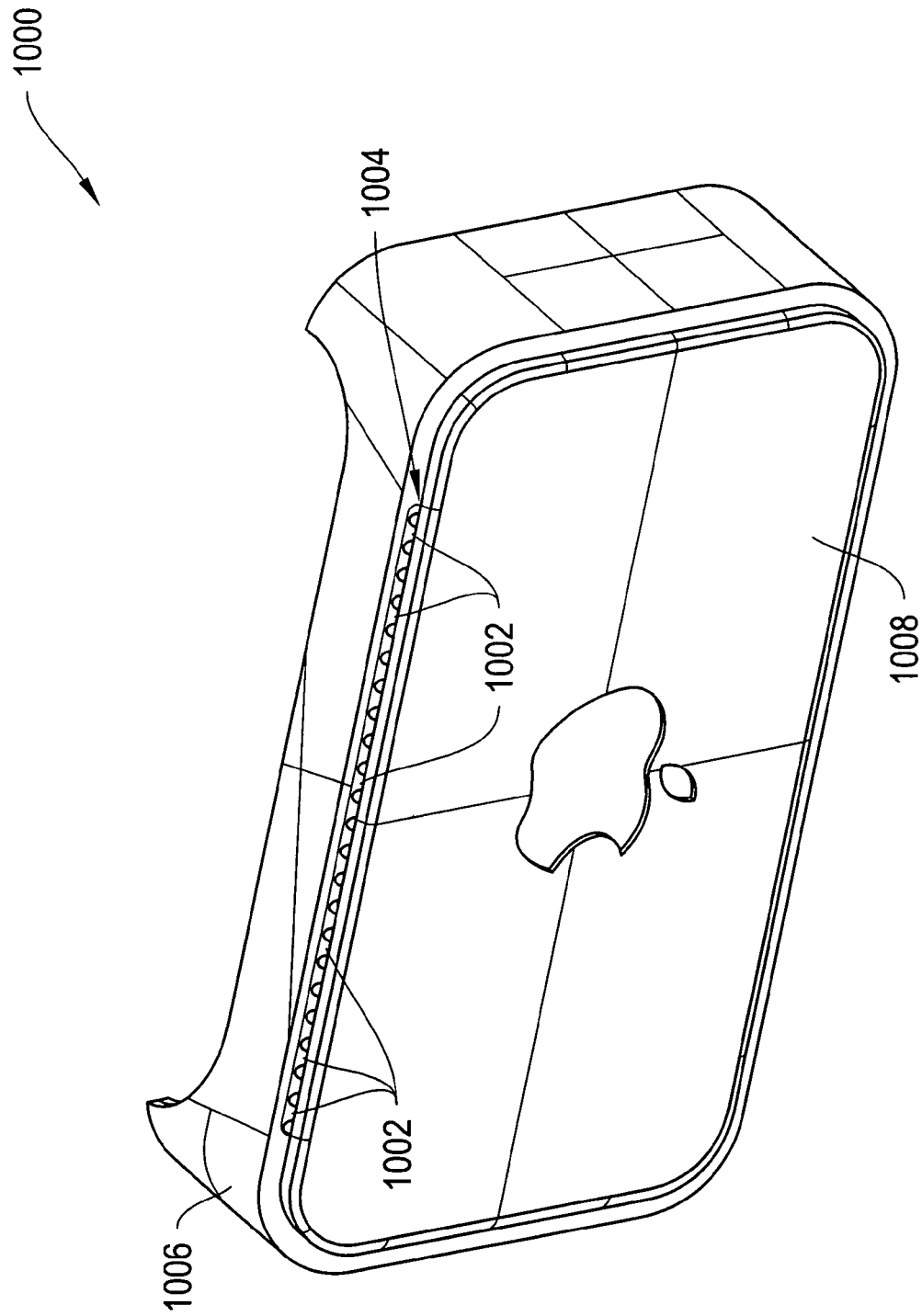
FIG. 10 shows a perspective view of a docking station including a plurality of external acoustic apertures according to an illustrative embodiment of the invention.

FIG. 10 shows a perspective view of a docking station 1000 including a plurality of external acoustic apertures 1002 according to an illustrative embodiment of the invention. In one embodiment, the external acoustic apertures 1002 are arranged in a slot 1004 that extends across the docking station 1000. Each of the external apertures 1002 may be interconnected by a common acoustic channel inside the docking station 1000. Alternatively, a portion of the apertures 1002 may be interconnected or each aperture 1002 may be associated with its own acoustic channel.

In one embodiment, the external acoustic apertures 1002 are positioned along an inconspicuous lower portion of the docking station 1000 in order to save the surfaces of the docking station 1000 for other purposes such as, for example, an aesthetically pleasing design. In one embodiment, the external apertures 1002 are positioned at an interface between a housing wall 1006 at the front and/or bottom of the docking station 1000 and a foot member 1008 that supports the bottom of the docking station 1000 as it rests on a surface.

Figure 11:
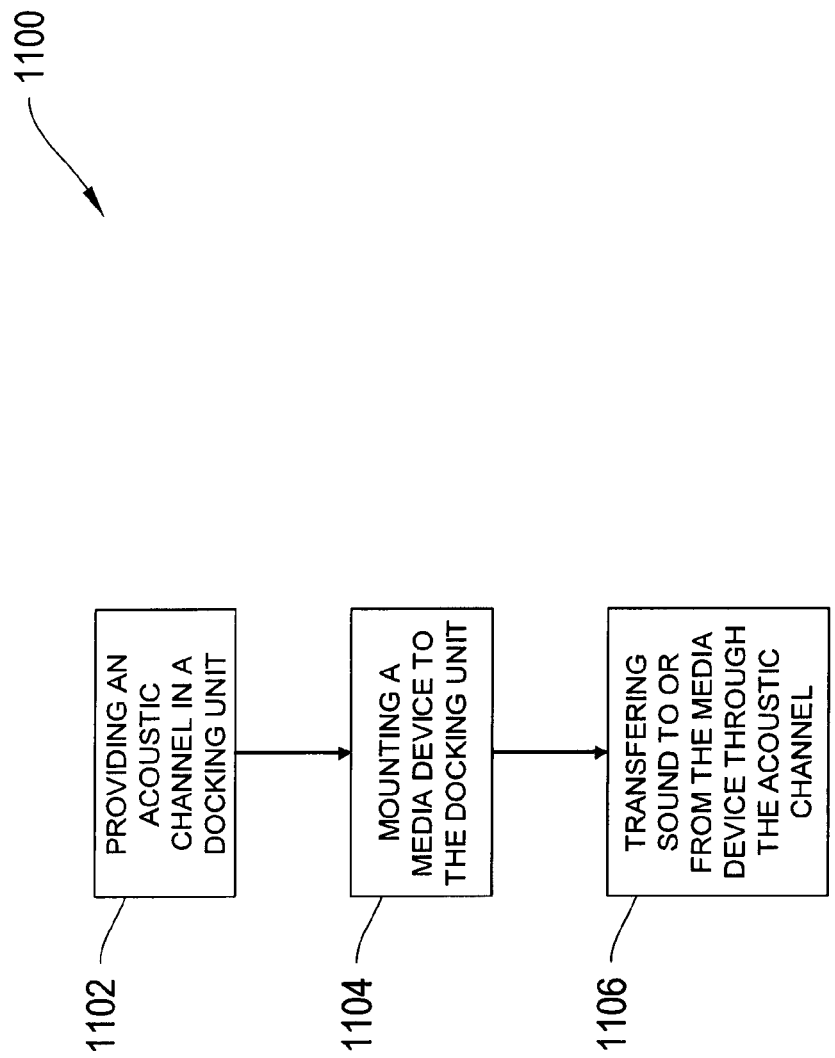
FIG. 11 is a flow chart of a process for transferring sound to or from a media device via an acoustic interface of a docking station according to an illustrative embodiment of the invention.

FIG. 11 is a flow chart of a process for transferring sound to or from a media device such as media device 100 via an acoustic interface or channel of a docking station according to an illustrative embodiment of the invention. First, an acoustic channel such a acoustic channel 902 of FIG. 9 is provided in a docking unit 900 (Step 1102).

Then, a media device such as media device 906 is mounted to the docking unit 900 (Step 1104). Finally, sound is transferred to or from the media device 906 through the acoustic channel 902 to enable efficient transfer of sound while the media device 906 is docked to the docking station 900 (Step 1106).

It is understood that the various features, elements, or processes of the foregoing figures and description are interchangeable or combinable to realize or practice the invention describe herein. Those skilled in the art will appreciate that the invention can be practiced by other than the described embodiments, which are presented for purposes of illustration rather than of limitation, and the invention is limited only by the claims which follow.

What is claimed is:

1. A docking unit for a portable media player device, comprising:
   a housing having an external surface;
   a well in the housing for receiving a portable media player device, the well having a wall;
   one or more first apertures on the wall within the well for exchanging non-electrical sound waves with one or more acoustic apertures of the portable media player device, wherein the one or more first apertures are positioned in close proximity to the one or more acoustic apertures when the portable media player device is docked in the well;
one or more second apertures on the external surface for exchanging the non-electrical sound waves with the surrounding environment; and
one or more acoustic channels for coupling the non-electrical sound waves between the one or more first apertures and the one or more second apertures.

2. The device of claim 1, wherein the one or more first apertures are positioned adjacent to the one or more acoustic apertures of the portable media player device.

3. The device of claim 2, wherein the one or more first apertures are positioned along the wall of the well of the docking unit, and wherein the well conforms to a shape of the portable media player device.

4. The device of claim 3, wherein the one or more second apertures are arranged in a pattern along the external surface of the housing of the docking unit.

5. The device of claim 1, wherein a first set of the one or more acoustic channels transports the non-electrical sound waves toward the portable media player device.

6. The device of claim 5, wherein a second set of the one or more acoustic channels transports the non-electrical sound waves away from the portable media player device.

7. The device of claim 6 comprising an insulator being positioned substantially between the first set and the second set of the one or more acoustic channels to reduce interference between the channels.

8. The device of claim 7, wherein the one or more first apertures include a first set of apertures in close proximity to an acoustic source of the portable media player device when the portable media player device is docked in the well.

9. The device of claim 8, wherein the one or more first apertures include a second set of apertures in close proximity to a microphone of the portable media player device when the portable media player device is docked in the well.

10. The device of claim 1 comprising an insulator for insulating sound from one portion of the housing of the docking station from another portion of the housing of the docking station.

11. The device of claim 1 comprising a support mechanism in the well for detachably holding the portable media player device.

12. The device of claim 11, wherein the support mechanism includes at least one of a clamp, a clip, an adhesive, a magnet, and a connector.

13. The unit of claim 1, wherein a first set of the one or more second apertures is coupled to a first set of the one or more acoustic channels.

14. The unit of claim 13, wherein a second set of the one or more second apertures is coupled to a second set of the one or more acoustic channels.

15. The unit of claim 14, wherein the first set of one or more acoustic channels and the second set of one or more acoustic channels are the same set of one or more acoustic channels.

16. The unit of claim 14, wherein a first set of the one or more first apertures is coupled to the first set of the one or more acoustic channels, and wherein a second set of the one or more first apertures is coupled to the second set of the one or more acoustic channels.

17. A method for delivering non-electrical sound waves from a portable media player device, comprising:
receiving with a docking unit the portable media player device in a well of a housing of the docking unit;
after receiving the portable media player device, receiving with the docking unit the non-electrical sound waves from an acoustic source of the received portable media player device through one or more first apertures on a wall of the well;
in response to receiving the non-electrical sound waves, transporting with the docking unit the received non-electrical sound waves through one or more acoustic channels of the docking unit in proximity to the portable media player device, the transporting from the one or more first apertures to one or more second apertures on an external surface of the housing; and
in response to the transporting, coupling with the docking unit the transported non-electrical sound waves from the one or more acoustic channels to outside of the docking unit.

18. The method of claim 17 wherein receiving the portable media player device comprises positioning the one or more first apertures of the docking unit adjacent to the portable media player device.

19. The method of claim 18 wherein the one or more first apertures are situated along the wall of the well of the docking unit, and wherein the well conforms to a shape of the portable media player device.

20. The method of claim 19 wherein the one or more second apertures are arranged in a pattern along the external surface of the housing of the docking unit.

21. The method of claim 20 wherein the one or more acoustic channels couple the one or more first apertures to the one or more second apertures.

22. A method for delivering non-electrical sound waves to a portable media player device, comprising:
receiving with a docking unit the portable media player device in a well of a housing of the docking unit;
after receiving the portable media player device, receiving with the docking unit the non-electrical sound waves from outside of the docking unit through one or more first apertures on an external surface of the housing;
in response to receiving the non-electrical sound waves, transporting with the docking unit the received non-electrical sound waves through one or more acoustic channels of the docking unit from the one or more first apertures to one or more second apertures on a wall of the well; and
in response to the transporting, coupling with the docking unit the transported non-electrical sound waves to the portable media player device.

23. The method of claim 22 wherein receiving the portable media player device comprises positioning the one or more second apertures of the docking unit adjacent to the portable media player device.

24. The method of claim 23 wherein the one or more second apertures are situated along the wall of the well of the docking unit, and wherein the well conforms to a shape of the portable media player device.

25. The method of claim 24 wherein one or more first apertures are arranged in a pattern along the external surface of the housing of the docking unit.

26. The method of claim 25 wherein the one or more acoustic channels couple the one or more first apertures to the one or more second apertures.

27. A docking unit for a portable media player device, comprising:
a well for receiving a portable media player device, the well having a wall;
a support structure in the well for holding the portable media player device;

one or more acoustic apertures on the wall within the well; and a spacer for separating a portion of the portable media player device from the wall when the portable media player device is held by the support structure, wherein sound flows between the one or more acoustic apertures and an audio aperture of the portable media player device through a gap formed by the spacer, and wherein the gap extends between the audio aperture of the portable media player device positioned in close proximity to the one or more acoustic apertures.

28. The unit of claim 27, wherein the spacer is a portion of an electrical connector, the electrical connector configured to extend into the portable media player device.

29. The unit of claim 27, wherein the spacer extends from the wall of the well of the docking unit.

30. The unit of claim 27, wherein the spacer is formed by a relief on the wall of the well of the docking unit.

31. The unit of claim 27, wherein the spacer forms the gap between a portion of the portable media player device and a portion of the docking unit, the gap establishing an acoustic channel through which sound is emitted from or received by the portable media player device.

32. A docking unit for a portable media player device, comprising:

a housing having an external surface;

a well in the housing for receiving a portable media player device, the well having a wall;

one or more first apertures on the wall within the well for aligning with an audio aperture of the portable media player device and for exchanging sound with the portable media player device, wherein the one or more first apertures are positioned adjacent to the audio aperture when the portable media player device is docked in the well;

one or more second apertures on the external surface for exchanging the sound with the surrounding environment; and one or more acoustic channels for coupling the sound between the one or more first apertures and the one or more second apertures.

* * * * *